(12) United States Patent
Schmidt et al.

(10) Patent No.: US 10,246,007 B2
(45) Date of Patent: Apr. 2, 2019

(54) ILLUMINATION APPARATUS, VEHICLE COMPONENT AND VEHICLE

(71) Applicant: SMR Patents S.à.r.l., Luxembourg (LU)

(72) Inventors: Oliver Schmidt, Stuttgart (DE); Daniel Fritz, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 138 days.

(21) Appl. No.: 15/262,396

(22) Filed: Sep. 12, 2016

(65) Prior Publication Data

US 2017/0072839 A1   Mar. 16, 2017

(30) Foreign Application Priority Data

Sep. 15, 2015   (DE) .................... 20 2015 104 894 U

(51) Int. Cl.
*B60Q 1/26*   (2006.01)
*F21S 43/20*   (2018.01)
(Continued)

(52) U.S. Cl.
CPC ......... *B60Q 1/2619* (2013.01); *B60Q 1/2665* (2013.01); *F21S 43/26* (2018.01);
(Continued)

(58) Field of Classification Search
CPC ................ B60Q 1/2665; B60Q 1/2619; B60Q 2400/50; F21S 43/37; F21S 43/40; F21S 43/26; G03B 21/28
See application file for complete search history.

(56) References Cited

U.S. PATENT DOCUMENTS

2003/0038928 A1   2/2003   Alden
2005/0117364 A1*  6/2005   Rennick ................ B60R 1/1207
                                                              362/540
(Continued)

FOREIGN PATENT DOCUMENTS

DE        10134594 A1    1/2003
DE   102004050600 A1    4/2006
(Continued)

OTHER PUBLICATIONS

Extended European Search Report, Application No. EP 16188657.7, dated Feb. 14, 2017.
(Continued)

*Primary Examiner* — Mary Ellen Bowman
(74) *Attorney, Agent, or Firm* — MacMillan, Sobanski & Todd, LLC

(57) ABSTRACT

An illumination apparatus for a vehicle component, especially for a rearview device of a motor vehicle, features at least one illuminant for emitting light and a condenser unit having at least one condenser lens. The condenser unit is adapted to focus the light emitted by the at least one illuminant into an optical path. At least one mask means is provided, which is arranged in the optical path and by means of which an image, symbol, logo and/or legend can be displayed on a projection surface. A lens unit having at least one objective lens, is arranged in the optical path, and at least one reflector unit, is arranged between the condenser unit and the projection surface. The reflector unit is adapted to deflect the optical path, especially essentially transversely or diagonally, to the projection surface, wherein the reflector unit comprises a reflector element which comprises at least one surface section by means of which the light can be deflected relative to the optical path. The surface section of
(Continued)

the reflector element is configured as a freeform surface in order to focus the light.

21 Claims, 3 Drawing Sheets

(51) Int. Cl.
    *F21S 43/37*     (2018.01)
    *F21S 43/40*     (2018.01)
    *G03B 21/28*     (2006.01)

(52) U.S. Cl.
    CPC ............... *F21S 43/37* (2018.01); *F21S 43/40* (2018.01); *G03B 21/28* (2013.01); *B60Q 2400/50* (2013.01)

(56) References Cited

U.S. PATENT DOCUMENTS

| | | |
|---|---|---|
| 2007/0273847 A1 | 11/2007 | Minami et al. |
| 2009/0161379 A1 | 6/2009 | Liesener |
| 2010/0238417 A1* | 9/2010 | Streppel ............... G03B 21/006 353/84 |
| 2010/0321945 A1 | 12/2010 | Lang et al. |
| 2013/0130674 A1* | 5/2013 | De Wind ............. B60Q 1/2619 455/420 |
| 2014/0328071 A1 | 11/2014 | Son et al. |
| 2014/0362596 A1 | 12/2014 | Nakaya |

FOREIGN PATENT DOCUMENTS

| | | |
|---|---|---|
| DE | 102006057671 A1 | 6/2008 |
| DE | 102008003451 A1 | 2/2009 |
| DE | 102012024494 A1 | 6/2014 |
| DE | 102014203313 A1 | 8/2015 |
| EP | 2009483 A1 | 12/2008 |
| WO | 2015122482 A1 | 8/2015 |

OTHER PUBLICATIONS

German Search Report, Application No. DE 202015104894.7, dated Aug. 5, 2016.

* cited by examiner

ILLUMINATION APPARATUS, VEHICLE COMPONENT AND VEHICLE

CROSS-REFERENCE TO RELATED APPLICATIONS

This application claims priority to German Utility Model Patent Application DE 20 2015 104 894.7, filed Sep. 15, 2015, the disclosure of which is incorporated herein by reference.

BACKGROUND OF THE INVENTION

This invention relates in general to an illumination apparatus, a vehicle component and a motor vehicle.

Illumination apparatuses for motor vehicles are known from the state of the art. DE 20 2008 016 695U1, for example, describes an illumination apparatus having a so-called logo lamp in which an image or legend is projected onto a projection surface through the interaction of an illuminant, a condenser unit, a mask means and a lens unit. The illumination apparatus is arranged in a rearview device realized as an external mirror in order to project an image or a legend onto a roadway or sidewalk. The individual components of the illumination apparatus are arranged behind one another in a tubular housing. Because of the essentially vertical course of the optical path, the known illumination apparatus in the external mirror is arranged essentially perpendicular to the projection surface. The illumination apparatus can be integrated directly into an external mirror, or be attached into a corresponding receptacle on the external mirror. Indeed, the rigid arrangement of the individual components of the illumination apparatus in the tubular housing makes it difficult to integrate the illumination apparatus into or onto the external mirror because of the limited space.

DE 101 34 594 A1 describes an illumination apparatus which is adapted to project an object correlated with the driving situation into a surrounding area of a vehicle.

DE 10 2004 050 600 A1 describes an illumination apparatus for a vehicle for generating a light field in the region of the vehicle door.

US 2009/0161379 A1 describes the projection of a pattern onto a subsurface using an illumination apparatus in an external mirror.

US 2014/0362596 A1, WO 2015/122482 A1 and DE 10 2006 057 671 A1 describe other illumination apparatuses for vehicles and/or components for illumination apparatuses.

It would therefore be desirable to provide an illumination apparatus that can be flexibly arranged into or onto a vehicle component.

SUMMARY OF THE INVENTION

The illumination apparatus according to the invention for a vehicle component, especially for a rearview device of a motor vehicle, features at least one illuminant, wherein the illuminant is adapted to emit light. The illumination apparatus furthermore features a condenser unit comprising at least one condenser lens, wherein the condenser unit is adapted to focus the light emitted by the at least one illuminant into an optical path. The term "optical path" in this connection refers to the geometrical course of light beams and can also be called beam direction. The term "focus" refers to coupling light into an optical path, wherein as large a portion of the emitted light of the illuminant as possible is to be brought into the image-forming optical path. Moreover, the illumination apparatus features at least one mask means, which is arranged in the optical path and by means of which an image, symbol, logo and/or legend can be displayed on a projection surface. Moreover, the illumination apparatus features a lens unit having at least one objective lens, which is arranged in the optical path. According to the invention, the illumination apparatus also features at least one reflector unit which is arranged between the condenser unit and the projection surface, wherein the reflector unit is adapted to deflect the optical path, especially essentially transversely or diagonally, to the projection surface, wherein the reflector unit comprises a reflector element which comprises at least one surface section by means of which the light can be deflected relative to the optical path, and wherein the surface section of the reflector element is configured as a freeform surface in order to focus the light. In this connection, the expression "deflect transversely or diagonally to the projection surface" relates to a deflection or diversion of the optical path at an angle to the vertical to the projection surface. "Deflection of the optical path" can also be understood as a deflection of an optical axis. In this connection, the term "optical axis" describes the averaged propagation direction of all beams in the image-forming optical path between successive units.

The use of the reflector unit allows the illumination apparatus to be arranged in or on the vehicle component in a place-saving manner. The illumination apparatus according to the invention does not need to be arranged exclusively vertical to a projection surface, but can also be arranged diagonally to the projection surface for example or parallel to the projection surface. This facilitates the integration of the illumination apparatus to the extent that a particular place does not absolutely have to be provided for the illumination apparatus, but the illumination apparatus can rather be provided in the vehicle component at a location and with an orientation that just happens to offer adequate space for its installation.

In one example, the reflector unit is adapted to deflect the optical path in a range of 35° to 145°, preferably of 45° to 135°, more preferably of 60° to 120°, especially by 90°.

In another example of the invention, the at least one reflector unit is arranged along the optical path of the light, proceeding from the illuminant up to the projection surface, in front of or behind the lens unit. In addition, the at least one reflector unit can however also be arranged any place inside the illumination apparatus. It is basically conceivable that the illumination apparatus comprises a plurality of reflector units. This proves advantageous particularly when the installation space available inside the vehicle component is not straight, but angular.

It is furthermore conceivable that the illuminant is surrounded by another reflector means in such a manner that light which is not coupled into the optical path is collected by the reflector means and coupled into the optical path. This allows the intensity of the light in the optical path and the utilization of the light emitted by the illuminant to be improved.

In still another example, the mask means is arranged along the optical path of the light, proceeding from the illuminant up to the projection surface, between the condenser unit and the lens unit.

In one example, the reflector unit comprises the mask means. The illumination apparatus can be realized compactly and with reduced components if the reflector unit comprises the mask means. In this case, the mask means and reflector unit can be comprised within a common component for example, or be joined in such a manner that they are undetachably or detachably connected together and can be added in as a pre-assembled subassembly of the reflector unit.

In another example, the mask means is mechanically and/or electrically alterable or adjustable in order to change the image, symbol, logo and/or the legend that the mask means can display on the projection surface. It is also basically conceivable to prescribe that the mask means cannot change the image, symbol, logo and/or the legend that the mask means can display on the projection surface. In addition, the mask means can display a plurality of images or a continuous legend, for example.

The reflector unit can basically be configured as desired. In one example, the reflector unit comprises a lens means arranged on the reflector element and configured as a separate or separable component in order to focus the light. In this example, the lens means can comprise the condenser unit and/or the lens unit.

If the surface section of the reflector element is configured as a freeform surface, then the reflector unit can be implemented compactly.

If a plurality of reflector units is provided, then it is conceivable for example that a first reflector unit comprises the condenser unit and a second reflector unit comprises the lens unit. This allows the number of individual components in the illumination apparatus to be further reduced.

In another example, the reflector unit comprises both the mask means and also the condenser unit and/or the lens unit. This advantageously allows the number of components of the illumination apparatus to be further reduced. The configuration of the reflector unit both as mask means and also as condenser unit and/or as lens unit is then especially advantageous when little space is available in the vehicle component to arrange the illumination apparatus therein or thereon.

In one example, the reflector unit comprises both the mask means and also the condenser unit and/or the lens unit. In still another example, the reflector element comprises a light guide and/or a prism.

In a further example, the at least one condenser lens of the condenser unit and/or the at least one objective lens of the lens unit comprises at least one toric lens element. This thereby advantageously allows rectangular displays with high irradiance, even in corners, to be realized in a simple manner.

If the illumination apparatus according to the invention is arranged parallel to a plane of a projection surface, then the illuminant can also emit the light essentially parallel to the projection surface. A diagonal emission relative to the projection surface is also conceivable.

The at least one condenser lens of the condenser unit and/or the at least one objective lens of the lens unit can be developed fundamentally or as desired.

In addition, the invention provides a vehicle component of a motor vehicle having at least one illumination apparatus according to the invention. The vehicle component can be any component on the vehicle that is arranged so that it can enable access to the external surroundings of the motor vehicle. To this end, it can for example concern a body panel for example, a bumper device, elements of the vehicle doors and the like. Preferably this vehicle component can comprise a rearview device, like interior or exterior mirror or camera.

In one example, the optical path of the light directly emitted by the illuminant runs essentially parallel to a driving surface. Since the optical path runs essentially parallel to the driving surface, the illumination apparatus is essentially arranged horizontally. In addition, it is nevertheless conceivable that the illumination apparatus is arranged running diagonally or vertically to the driving surface.

In another example, at least one hollow space, which forms a housing for the illumination apparatus and within which the illumination apparatus can be fixed, is configured in the vehicle component. It is basically conceivable that the illumination apparatus is fixed on the vehicle component for example. To nevertheless be able to protect the illumination apparatus from damage and soiling, it proves advantageous if the illumination device can be fixed within the vehicle component. In addition to protection from soiling and damage, an arrangement of the illumination apparatus that is optically appropriate is thereby furthermore selected.

Finally, the invention also provides a motor vehicle having at least one vehicle component according to the invention.

The illumination apparatus, the vehicle component and the motor vehicle of the invention prove advantageous in multiple respects. Since the illumination apparatus comprises at least one reflector unit, the illumination apparatus can be arranged in or on the vehicle component in any orientation. This again makes possible a large number of different installation situations thereby extending the applicability of the illumination apparatus.

Since the reflector unit can comprise both the mask means and also the condenser unit and/or the lens unit, by means of a freeform surface for example, the illumination apparatus can be realized with reduced components and can be implemented compactly.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
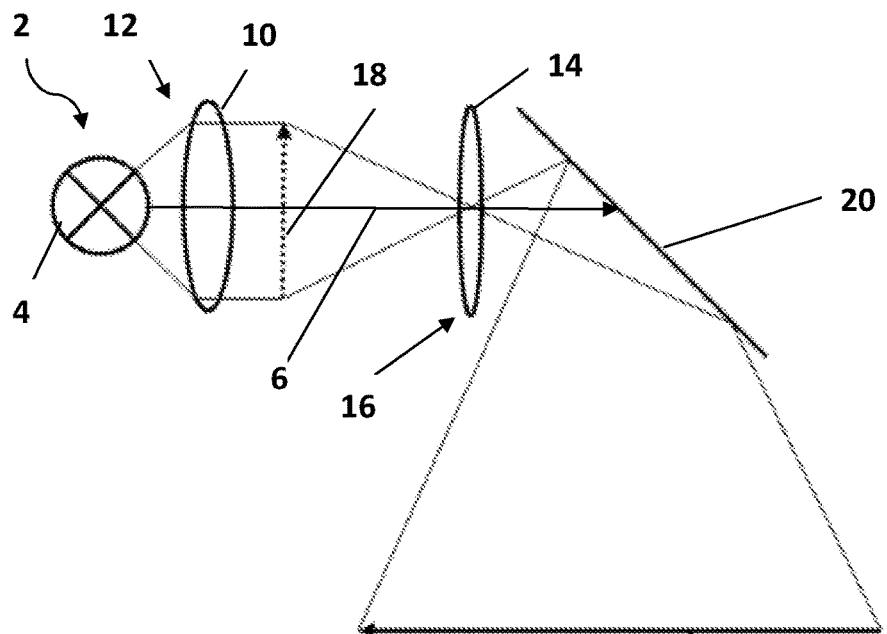
FIG. 1 is a schematic representation of a first embodiment example of an illumination apparatus according to the invention.

The figures each depict an illumination apparatus 2 for a vehicle component of a motor vehicle as in the form of an external mirror, for example. The depicted illumination apparatuses 2 each comprise an illuminant 4 by means of which light can be emitted, essentially parallel to a plane of a projection surface 8 for example.

In addition, each illumination apparatus 2 comprises at least one condenser lens 10 of a condenser unit 12. The condenser lens 10 couples the light emitted by the illuminant 4 into an optical path 6, which can also run essentially parallel to the plane of the projection surface 8, depending on the embodiment example.

As depicted in the figures, the illumination apparatus 2 also comprises at least one objective lens 14 of a lens unit 16.

In order to display a logo 8, for example, onto the projection surface, the illumination apparatus 2 furthermore comprises a mask means 18.

The illumination apparatuses 2 illustrated in the figures furthermore each comprise a reflector unit 20, which makes it possible for the optical path 6 to be deflected essentially transversely or diagonally to the projection surface 8.

FIG. 1 depicts a first embodiment example of the illumination apparatus 2. In this example, the condenser unit 12, which also comprises the condenser lens 10, is provided directly following the illuminant 2. Subsequently, the light passes through the mask means 18 before it impinges on the objective lens 14, which is comprised in the lens unit 16. In the further course of the optical path 6, the light then impinges on the reflector unit 20, which deflects it by essentially 90° degrees onto the projection surface 8.

Figure 2:
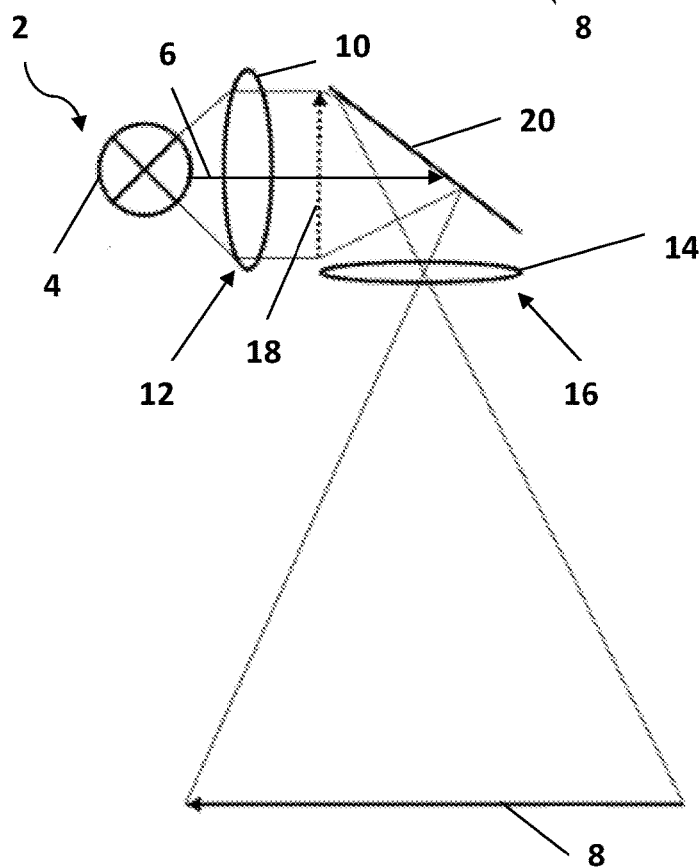
FIG. 2 is a schematic representation of a second embodiment example of an illumination apparatus according to the invention.

FIG. 2 depicts a second embodiment example of the illumination apparatus 2. In this embodiment, as also shown in FIG. 1, first the illuminant 4, the condenser unit 12 and the mask means 18 are arranged one behind the other so that the light also passes through these components successively. Then the light does not pass through the lens unit 16 however, but is first deflected on the reflector unit 20. After being deflected by the reflector unit 20, the light passes through the lens unit 16 to then arrive at the projection surface 8. This construction allows a reduction in the space needed for installation.

Figure 3:
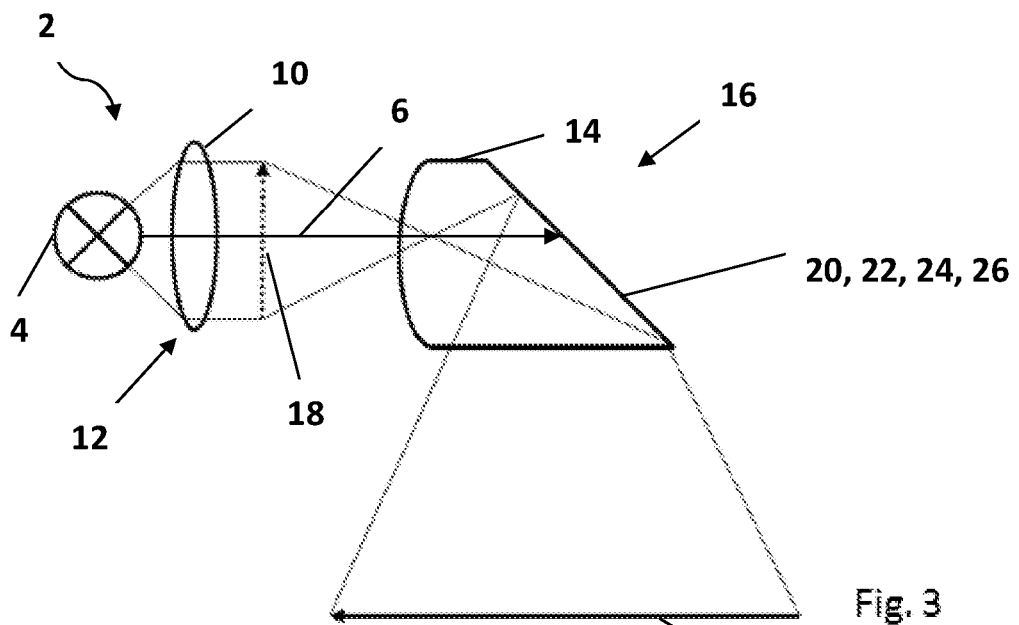
FIG. 3 is a schematic representation of a third embodiment example of an illumination apparatus according to the invention.

FIG. 3 depicts a third embodiment example of the illumination apparatus 2. In this embodiment example, the illumination apparatus is implemented with reduced components. The light emitted by the illuminant 4 first passes through the condenser unit 12 and the mask means 18, then, as already shown in FIG. 2, it directly impinges on the reflector unit 20. In the embodiment example depicted in FIG. 3, a reflector element 22, which comprises a light guide 24 and/or a prism 26, forms the reflector unit 20. The reflector element 22 thereby assumes the function of the lens unit 16. The embodiment example of the illumination apparatus 2 depicted in FIG. 3 can thus be produced with reduced components and implemented compactly.

Figure 4:
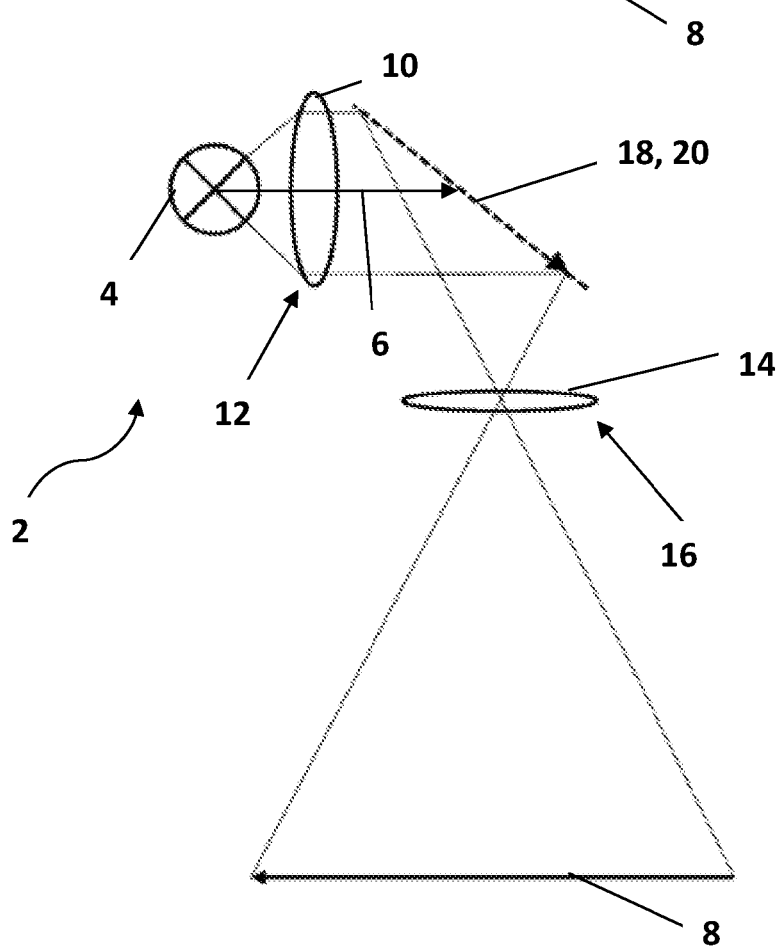
FIG. 4 is a schematic representation of a fourth embodiment example of an illumination apparatus according to the invention.

FIG. 4 depicts a fourth embodiment example of the illumination apparatus 2. The depicted illumination apparatus 2 essentially corresponds to the illumination apparatus 2 depicted in FIG. 2. In contrast to the illumination apparatus 2 depicted in FIG. 2, here no mask means 18 configured as a separate component is provided between the condenser unit 12 and reflector unit 20. Rather, the mask means 18 and the reflector unit 20 are combined in a common component. The installation dimensions of the illumination apparatus 2 can thereby also be reduced.

Figure 5:
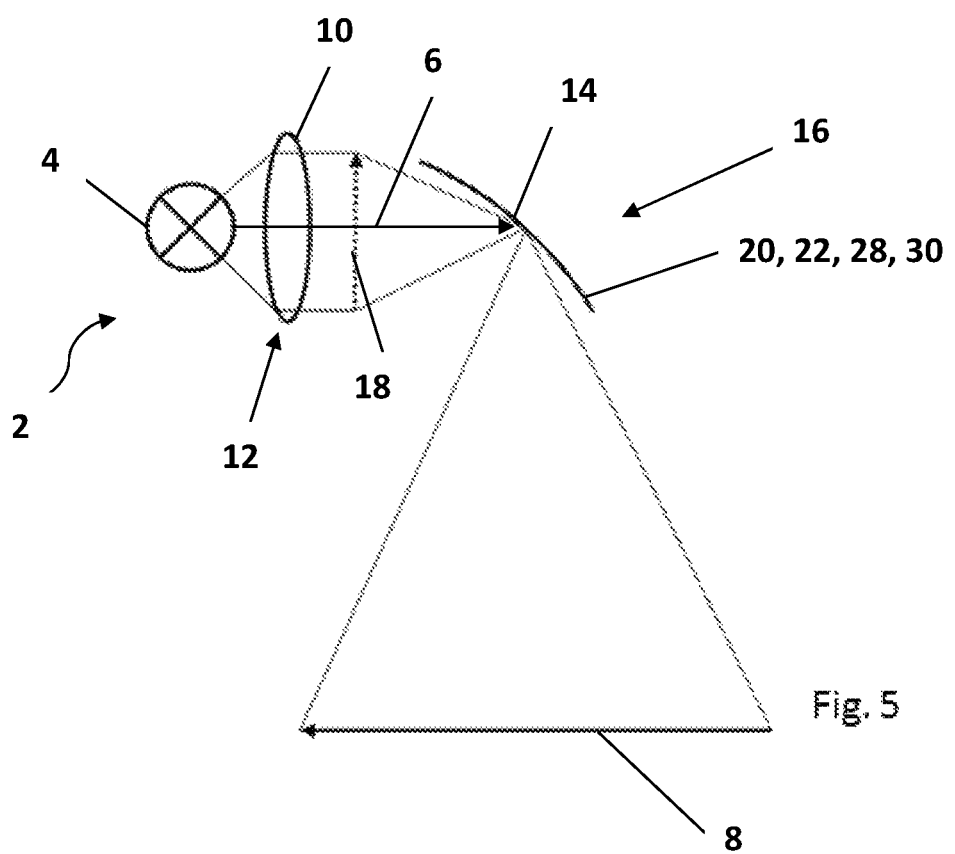
FIG. 5 is a schematic representation of a fifth embodiment example of an illumination apparatus according to the invention.

FIG. 5 depicts a fifth embodiment example of the illumination apparatus 5. In the depicted embodiment example, the lens unit 16 and the reflector unit 20 are comprised within a common component. In contrast to the embodiment example depicted in FIG. 3, the reflector unit 20 does not comprise a light guide and/or prism as reflector element 22, but is realized by a freeform surface 28, which is configured on a surface section 30 of the reflector element 22.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An illumination apparatus for a vehicle component, especially for a rearview device of a motor vehicle, comprising:
    at least one illuminant for emitting light;
    a condenser unit having at least one condenser lens, wherein the condenser unit is adapted to focus the light emitted by the at least one illuminant into an optical path;
    at least one mask means, which is arranged in the optical path and by means of which an image, symbol, logo and/or legend can be displayed on a projection surface;
    a lens unit having at least one objective lens, which is arranged in the optical path and provides a magnification characteristic to the image, symbol, logo and/or legend displayed on the projection surface; and
    at least one reflector unit, which is arranged between the condenser unit and the projection surface, wherein the reflector unit is adapted to deflect the optical path, especially essentially transversely or diagonally, to the projection surface, wherein the reflector unit comprises a reflector element which comprises at least one surface section by means of which the light can be deflected relative to the optical path, and wherein the surface section of the reflector element is configured as a freeform surface in order to focus the light, and further wherein the light which is emitted from the at least one illuminant is configured to change direction only upon passing through the reflector unit and does not change direction upon passing through the objective lens.

2. The illumination apparatus according to claim 1, wherein the at least one reflector unit is adapted to deflect the optical path in a range of 35° to 145°.

3. The illumination apparatus according to claim 1, wherein the at least one reflector unit is arranged along the optical path of the light from the illuminant up to the projection surface in front of or behind the lens unit.

4. The illumination apparatus according to claim 1, wherein the mask means is arranged along the optical path of the light from the illuminant to the projection surface between the condenser unit and the lens unit.

5. The illumination apparatus according to claim 1, wherein the reflector unit comprises the mask means.

6. The illumination apparatus according to claim 1, wherein the mask means is mechanically and/or electrically alterable or adjustable in order to change the image, symbol, logo and/or the legend that the mask means can display on the projection surface.

7. The illumination apparatus according to claim 1, wherein the reflector unit comprises a lens means arranged on the reflector element and configured as a separate or separable component in order to focus the light.

8. The illumination apparatus according to claim 7, wherein the lens means and/or the freeform surface comprises or comprise the condenser unit and/or the lens unit.

9. The illumination apparatus according to claim 7, wherein the reflector unit comprises both the mask means and also the condenser unit and/or the lens unit.

10. The illumination apparatus according to claim 7, wherein the reflector element comprises a light guide and/or a prism.

11. The illumination apparatus according to claim 1, wherein the at least one condenser lens of the condenser unit and/or the at least one objective lens of the lens unit comprises or comprise at least one toric lens element.

12. The illumination apparatus according to claim 1, wherein the illuminant emits the light essentially parallel and/or diagonally to the projection surface.

13. A vehicle component of a motor vehicle having at least one illumination apparatus according to claim 1.

14. The vehicle component according to claim 13, wherein at least one hollow space, which forms a housing for the illumination apparatus and within which the illumination apparatus can be fixed, is configured in the vehicle component.

15. A motor vehicle having at least one vehicle rearview device configured as one of an internal or external mirror or camera, according to claim 13.

16. The illumination apparatus according to claim 2, wherein the at least one reflector unit is adapted to deflect the optical path in the range of 45° to 135°.

17. The illumination apparatus according to claim 2, wherein the at least one reflector unit is adapted to deflect the optical path in the range of 60° to 120°.

18. The illumination apparatus according to claim 2, wherein the at least one reflector unit is adapted to deflect the optical path by about 90°.

19. The vehicle component according to claim 13 wherein the vehicle component is a rearview device configured as at least one of an internal or external mirror or camera.

20. An illumination apparatus for a vehicle component, especially for a rearview device of a motor vehicle, comprising:
- at least one illuminant for emitting light;
- a condenser unit having at least one condenser lens, wherein the condenser unit is adapted to focus the light emitted by the at least one illuminant into an optical path;
- at least one mask means, which is arranged in the optical path and by means of which an image, symbol, logo and/or legend can be displayed on a projection surface;
- a lens unit having at least one objective lens, which is arranged in the optical path and provides a magnification characteristic to the image, symbol, logo and/or legend displayed on the projection surface; and
- at least one reflector unit, which is arranged between the condenser unit and the projection surface, wherein the reflector unit is adapted to deflect the optical path, especially essentially transversely or diagonally, to the projection surface, wherein the reflector unit comprises a reflector element which comprises at least one surface section by means of which the light can be deflected relative to the optical path, and wherein the surface section of the reflector element is configured as a freeform surface in order to focus the light.

21. An illumination apparatus for a vehicle component, especially for a rearview device of a motor vehicle, comprising:
- at least one illuminant for emitting light;
- a condenser unit having at least one condenser lens, wherein the condenser unit is adapted to focus the light emitted by the at least one illuminant into an optical path;
- at least one mask means, which is arranged in the optical path and by means of which an image, symbol, logo and/or legend can be displayed on a projection surface;
- a lens unit having at least one objective lens, which is arranged in the optical path; and
- at least one reflector unit, which is arranged between the condenser unit and the projection surface, wherein the reflector unit is adapted to deflect the optical path, especially essentially transversely or diagonally, to the projection surface, wherein the reflector unit comprises a reflector element which comprises at least one surface section by means of which the light can be deflected relative to the optical path, and wherein the surface section of the reflector element is configured as a freeform surface in order to focus the light, and further wherein the light which is emitted from the at least one illuminant is configured to change direction only upon passing through the reflector unit and does not change direction upon passing through the objective lens.

* * * * *